US010760450B2

(12) United States Patent
Jung

(10) Patent No.: US 10,760,450 B2
(45) Date of Patent: Sep. 1, 2020

(54) GAS TURBINE AND METHOD FOR REPLACING BEARING THEREOF

(71) Applicant: DOOSAN HEAVY INDUSTRIES & CONSTRUCTION CO., LTD, Changwon-si, Gyeongsangnam-do (KR)

(72) Inventor: Sung Chul Jung, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 193 days.

(21) Appl. No.: 15/811,591

(22) Filed: Nov. 13, 2017

(65) Prior Publication Data

US 2018/0135466 A1    May 17, 2018

(30) Foreign Application Priority Data

Nov. 17, 2016  (KR) .................. 10-2016-0153361

(51) Int. Cl.
| | |
|---|---|
| *F01D 25/28* | (2006.01) |
| *B25B 27/06* | (2006.01) |
| *F01D 25/16* | (2006.01) |
| *F16C 35/06* | (2006.01) |

(52) U.S. Cl.
CPC ............ *F01D 25/285* (2013.01); *B25B 27/06* (2013.01); *F01D 25/162* (2013.01); *F16C 35/062* (2013.01); *F05D 2230/60* (2013.01); *F05D 2230/68* (2013.01); *F05D 2230/70* (2013.01); *F05D 2230/80* (2013.01); *F05D 2240/50* (2013.01); *F16C 2360/23* (2013.01)

(58) Field of Classification Search
CPC ...... F01D 25/285; F01D 25/162; F01D 25/16; F01D 25/18; F01D 5/066; F16C 35/062; F16C 2360/23; B25B 27/06; F05D 2230/68; F05D 2230/80; F05D 2230/70; F05D 2230/60; F05D 2240/50; F05D 2240/24; F05D 2260/31; F05D 2220/32
See application file for complete search history.

(56) References Cited

U.S. PATENT DOCUMENTS

| | | |
|---|---|---|
| 8,127,417 B1 | 3/2012 | Butler et al. |
| 2010/0139064 A1 | 6/2010 | Floter et al. |

FOREIGN PATENT DOCUMENTS

| | | |
|---|---|---|
| GB | 2099923 A | 12/1982 |
| JP | 6154846 A | 3/1986 |
| JP | 2001-062748 A | 3/2001 |
| JP | 2014509363 A | 4/2014 |
| KR | 10-2014-0113998 A | 9/2014 |

OTHER PUBLICATIONS

A Japanese Office Action dated Oct. 2, 2018 in connection with Japanese Patent Application No. 2017-221354 which corresponds to the above-referenced U.S. application.
European Search Report.

*Primary Examiner* — Moshe Wilensky
(74) *Attorney, Agent, or Firm* — Invenstone Patent, LLC

(57) ABSTRACT

A gas turbine and a method for replacing a bearing thereof to easily adjust a clearance of a bearing housing and a bearing covering a tie rod, such that the bearing can be easily replaced is disclosed.

20 Claims, 9 Drawing Sheets

GAS TURBINE AND METHOD FOR REPLACING BEARING THEREOF

CROSS-REFERENCE(S) TO RELATED APPLICATIONS

This application claims priority to Korean Patent Application No. 10-2016-0153361, filed on Nov. 17, 2016 the disclosure of which is incorporated herein by reference in its entirety.

BACKGROUND

Exemplary embodiments of the present disclosure relate to a gas turbine, and more particularly, to a method for replacing a bearing covering the outside of a tie rod installed in a gas turbine.

In general, a gas turbine refers to a type of internal combustion engine that converts thermal energy into mechanical energy by the expanding high-temperature and high-pressure combustion gas in a turbine. The high-temperature and high-pressure combustion gas is generated by burning a mixture of air and fuel, the air being compressed to high pressure by a compressor. The compressor and the turbine are driven by rotational force through a rotor.

The gas turbine includes a plurality of compressor rotor disks each having a plurality of compressor blades arranged on the outer circumferential surface thereof, the components of which make up a compressor rotor and a turbine rotor.

The gas turbine uses a tie rod for not only connecting the compressor rotor disks to each other such that the compressor rotor disks are rotated together, but also for connecting a plurality of turbine rotor disks to each other such that the turbine rotor disks are rotated together, the plurality of turbine rotor disks each having a plurality of turbine blades arranged on the outer circumference thereof. Since the tie rod is extended through the centers of the compressor rotor disks and the turbine rotor disks, the compressor rotor disks and the turbine rotor disks can be stably fastened.

Recently, however, the increase in size and efficiency of gas turbines have increased the whole lengths of the gas turbines. Therefore, the support for the tie rod, which is rotated at high speed with the compressor rotor and the turbine rotor of the gas turbine, may become destabilized. Furthermore, the turbine rotor has a bearing mounted therein, in order to guarantee a stable rotation through the rotation of the tie rod.

The tie rod extends through the compressor rotor having a plurality of compressor rotor disks installed therein and the turbine rotor having a plurality of turbine rotor disks installed therein. In particular, it is not easy to install a unit for stably supporting the rotating tie rod in a space where combustors are radially arranged at the outer circumference between the compressor rotor and the turbine rotor along the center axis of the gas turbine.

The bearing needs to be replaced after being used for a predetermined period. In order to replace the bearing, heavy equipment such as a crane must be used to lift the rotor. In this case, it is difficult to precisely control the crane.

For example, the outside of the bearing is covered by a bearing housing, and a gap between the bearing and the bearing housing is just a few millimeters. Therefore, when the crane is not precisely controlled, the neighboring parts may be damaged or broken. Thus, safety is inevitably lowered.

SUMMARY

The present disclosure addresses the above problems, and it is an object of the present disclosure to provide a gas turbine which allows an operator to stably replace a bearing covering a tie rod, thereby improving the workability of the operator, and a method for replacing a bearing thereof.

Other objects and advantages of the present disclosure can be understood by the following description, and become apparent with reference to the exemplary embodiments. Also, those skilled in the art to which the present disclosure pertains would recognize that the objects and advantages of the present disclosure can be realized by the means as claimed and combinations thereof.

In accordance with one aspect, a gas turbine includes a compressor rotor having a plurality of compressor rotor disks installed therein, a turbine rotor having a plurality of turbine rotor disks installed therein, a tie rod extended through the central axes of the plurality of compressor rotor disks and the central axes of the plurality of turbine rotor disks, an insertion part coupled to one end of the tie rod extended toward the turbine rotor to replace a bearing covering the end of the tie rod, and a support part having a moving part for moving the tie rod upward and downward while supporting the bottom of the insertion part.

The insertion part may include a body part formed at a position facing the end of the tie rod, and the body part may have a groove with a diameter corresponding to the diameter of the tie rod.

The body part may be formed in a cylindrical shape, and has a plurality of unit bodies.

The gas turbine may further include an internal casing covering the outside of the tie rod, and having a drain groove through which lubricant oil supplied for smooth rotation of the tie rod drains, wherein a mounting member to which the support part is temporarily fixed is installed in the drain groove.

The mounting member may be pressed against the drain groove, communicate with a path which is partially inserted into a drain hole formed in the center of the drain groove, and include mounting holes formed along the circumferential direction based on the path.

Each of the mounting holes may have a screw thread formed on the inner circumference thereof.

The support part may include insertion holes having a diameter corresponding to the mounting holes and a support body extended toward the tie rod, and the moving part may be screw-coupled to the center of the support body facing the insertion part.

A bolt which is moved upward and downward in the center of the support body may be used as the moving part. The bolt may include a bolt head, and a zero point part may be formed on the support body facing the bolt head.

A reference point indication part may be formed at the bottom of the bolt head, and rotated in the clockwise direction or the counterclockwise direction only by an operator's operation.

The bolt head facing the zero point part may have an indication part for indicating a moving distance of the tie rod according to the rotation direction of the bolt head, which is relatively rotated based on the zero point part.

The indication part may indicate a moving distance depending on when the bolt head is rotated in the clockwise direction or the counterclockwise direction.

The support part may include a plurality of first support legs extended toward the insertion part from the outside of the mounting holes, and separated from each other, a cylinder coupled to the tops of the first support legs and horizontally extended under the tie rod, a wedge part inserted in the axial direction of the cylinder and moved along the axial direction of the cylinder when being rotated in the cylinder, a bolt bar inserted in the axial direction of the wedge part, and relatively rotated with respect to the wedge part, and flanges inserted onto front and rear ends of the bolt bar.

The cylinder may have a diameter that decreases from one end toward the other end thereof based on the axial direction.

The wedge part may be formed in a shape corresponding to the cylinder.

In accordance with another aspect, a method for replacing a bearing of a gas turbine which includes a compressor rotor, a turbine rotor, a tie rod extended through the compressor rotor and the turbine rotor, and a bearing covering the tie rod includes disassembling a rear cover of the gas turbine in order to replace the bearing, disassembling a bearing housing cover after the disassembling of the rear cover, coupling an insertion part to an end of the tie rod and installing a support part at the bottom of the insertion part, adjusting a clearance between the bearing and a bearing housing by adjusting the height of the support part in the vertical direction, and replacing the existing bearing with a new bearing after the adjusting of the clearance.

The adjusting of the clearance between the bearing and the bearing housing may include checking the current clearance between the bearing and the bearing housing, and adjusting the clearance evenly in the circumferential direction of the bearing through the support part, depending on the clearance between the bearing and the bearing housing.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

In the accompanying drawings, the thickness or size of each layer is exaggerated, omitted, or schematically illustrated for convenience in description and clarity. Furthermore, the terms as used herein are defined by taking functions of the exemplary embodiments into account and can be changed according to the custom or intention of users or operators. Therefore, definition of the terms should be made according to the overall disclosures set forth herein. The exemplary embodiments of the present disclosure are only examples of components described in claims, and are not intended to limit the scope, and claims must be analyzed on the basis of the technical idea throughout the present specification.

Figure 1:
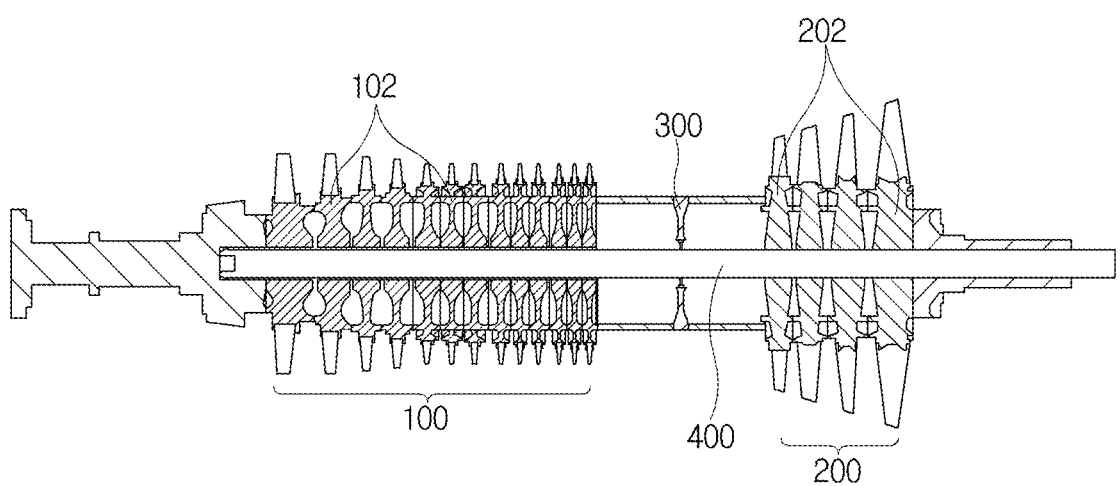
FIG. 1 is a cross-sectional view of a gas turbine according to an exemplary embodiment.
Figure 2:
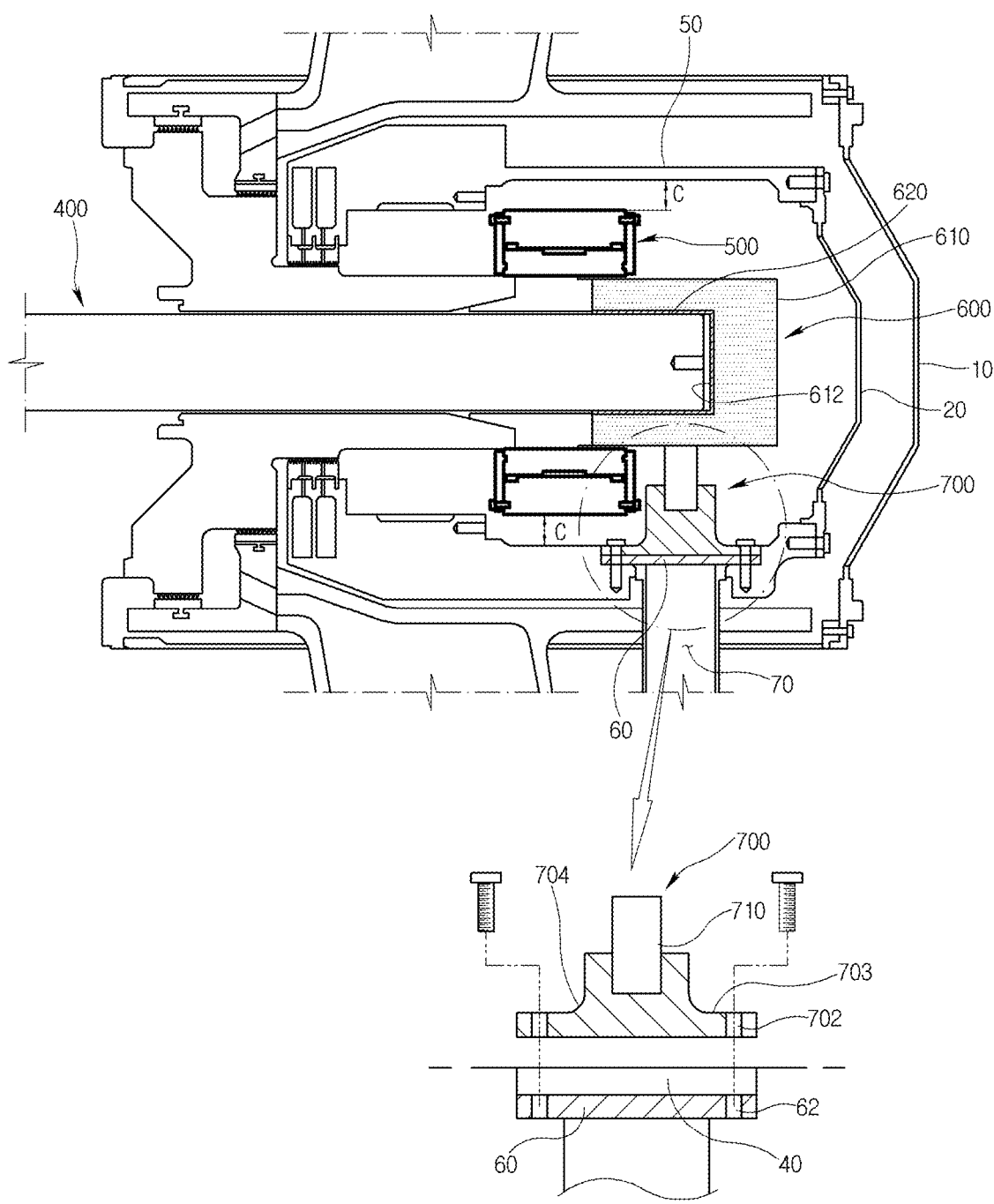
FIG. 2 is a longitudinal cross-sectional view of a bearing portion of the gas turbine illustrating an insertion part coupled to a tie rod according to an exemplary embodiment.
Figure 3:
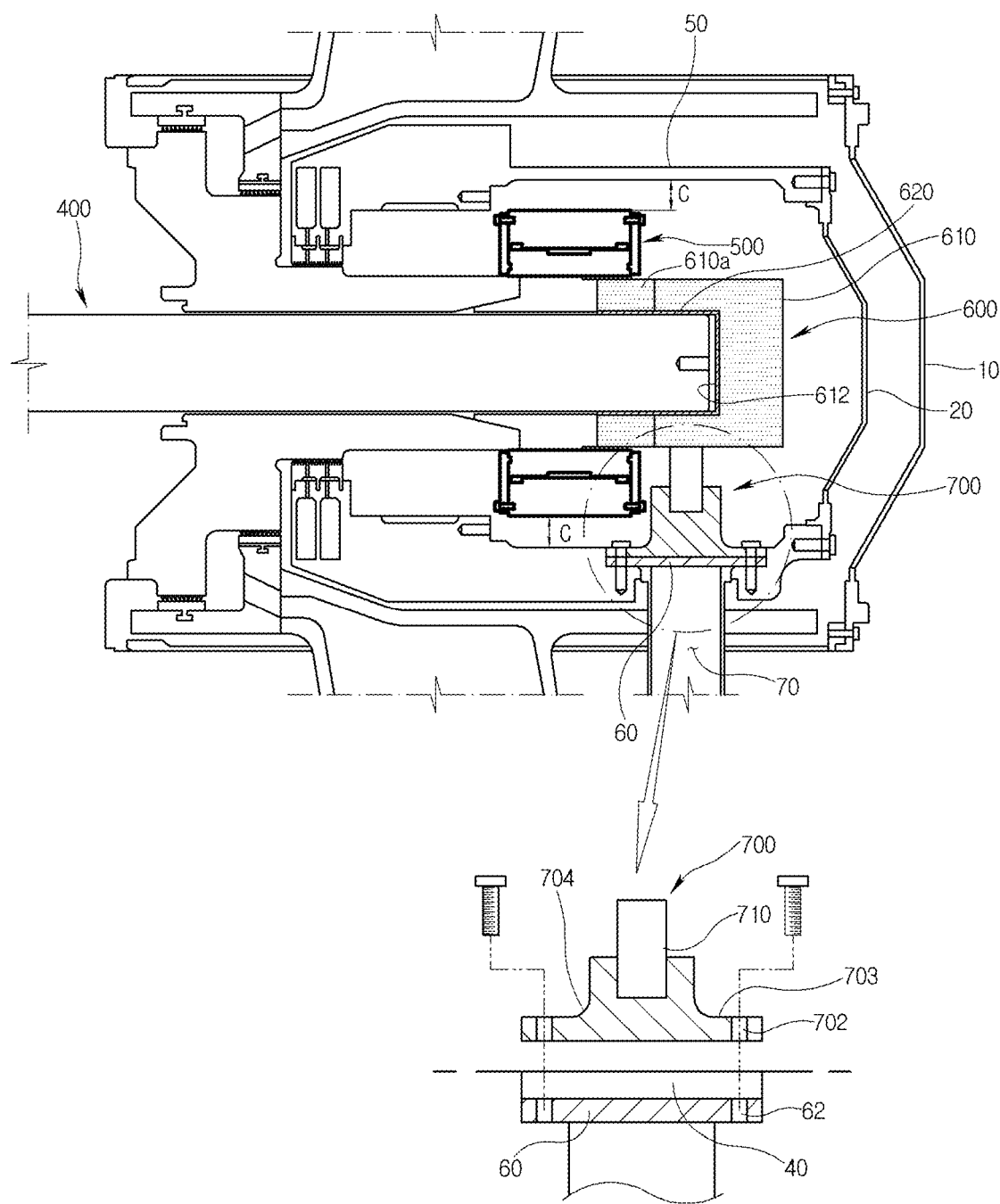
FIG. 3 is a longitudinal cross-sectional view of a bearing portion of the gas turbine illustrating an insertion part coupled to a tie rod according to another exemplary embodiment.
Figure 4:
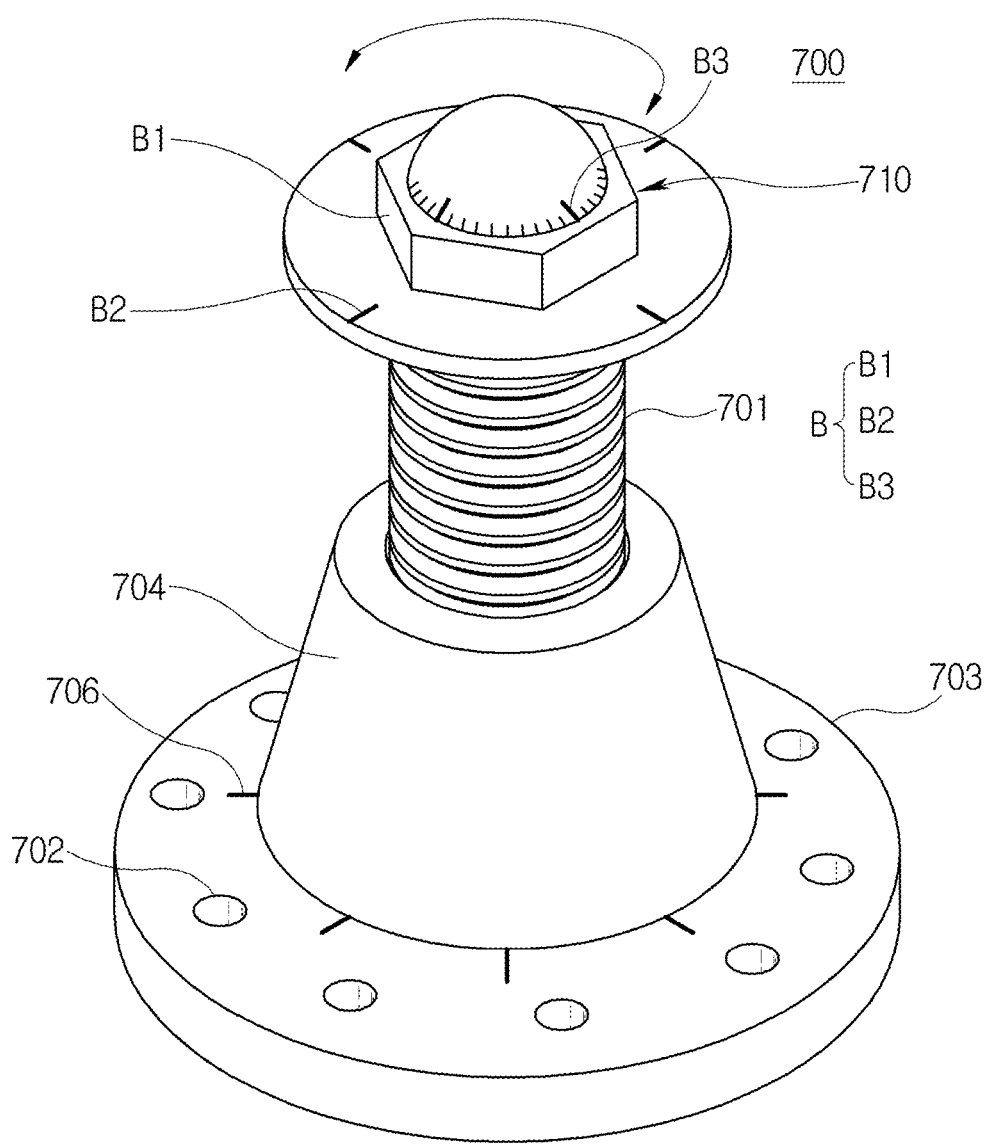
FIG. 4 is a perspective view of a support part according to an exemplary embodiment.

For reference, FIG. 1 is a cross-sectional view illustrating a structure of a gas turbine according to an exemplary embodiment. FIG. 2 is a longitudinal cross-sectional view of a portion where a bearing according to an exemplary embodiment is located. FIG. 3 is a longitudinal cross-sectional view of an insertion part according to another exemplary embodiment. FIG. 4 is a perspective view of the support part illustrated in FIG. 3.

Referring to FIG. 1, a gas turbine according to an exemplary embodiment includes a compressor rotor 100, a turbine rotor 200, a connection part 300, and a tie rod 400. The compressor rotor 100 includes a plurality of compressor rotor disks 102 installed therein and the turbine rotor 200 includes a plurality of turbine rotor disks 202 installed therein. The connection part 300 is installed to connect the compressor rotor 100 and the turbine rotor 200 to each other. The tie rod 400 is extended through the central axes of the plurality of compressor rotor disks 102 and the central axes of the plurality of turbine rotor disks 202.

Referring to FIG. 2, the insertion part 600 is coupled to an end of the tie rod 400 extended toward the turbine rotor 200 and covering the end of the tie rod 400 in order to replace a bearing 500. The support part 700 includes a moving part 710 which moves the tie rod 400 upward and downward while supporting the bottom of the insertion part 600. For reference, the bearing 500 is located at the right end of the turbine rotor disk 202 shown in FIG. 1, and the outside of the tie rod 400 is covered by an internal casing 50.

The internal casing 50 and the bearing 500 have a clearance C provided therebetween. The clearance C needs to be constantly maintained between the outer circumference of the bearing 500 and the inner circumference of the internal casing 50 in order to not only guarantee a stable operation of the bearing 500, but also prevent eccentricity of the tie rod 400.

Since parts installed in the bearing 500 may become damaged or deformed while the bearing 500 is used for a long period, the bearing 500 needs to be periodically replaced. Thus, an operator must remove a rear cover 10 and a bearing housing cover 20, which will be described later, and manually replace the bearing 500 in the gas turbine. For reference, the rear cover 10 and the bearing housing cover 20 are detachably installed outside the end of the tie rod 400 via a coupling member, such as a bolt.

The clearance C between the bearing 500 and the internal casing 50 needs to be constantly maintained in order to facilitate the separation and replacement of the bearing 500. Thus, before the bearing 500 is replaced, the clearance C between the internal casing 50 and the bearing 500 needs to be constantly adjusted for stable replacement. For this condition, the tie rod 400 may be stably supported by the insertion part 600 and the support part 700, and the clearance C between the internal casing 50 and the bearing 500 may be adjusted so as not to be eccentric from a specific position. Then, the bearing 500 can be stably replaced. For reference, the clearance C corresponds to a distance between the outer circumference of the bearing 500 and the inner circumference of the internal casing 50.

In the present exemplary embodiment, the insertion part 600 includes a body part 610 facing the end of the tie rod 400 and forming the exterior of the insertion part 600. The body part 610 has a groove 612 facing the tie rod 400, the groove 612 having a diameter corresponding to the diameter of the tie rod 400. In this case, when the insertion part 600 is coupled to the end of the tie rod 400, the tie rod 400 is inserted into the groove 612 by a length illustrated in FIG. 2. The insertion part 600 is not used during normal operations of the gas turbine, but inserted onto the end of the tie rod 400 only when the bearing 500 is replaced.

The insertion part 600 prevents direct contact between the support part 700 and the outer surface of the tie rod 400 when the tie rod 400 is moved by the support part 700. Therefore, the insertion part 600 can prevent deformation or damage of the end portion of the tie rod 400 by replacement of the bearing 500.

The insertion part 600 functions as a protective cap which protects the tie rod 400 during replacement of the bearing 500 and promotes a stable operation of the support part 700. The insertion part 600 may have a pad layer 620 formed on the surface of the groove 612 into which the tie rod 400 is inserted. The pad layer 620 may be formed to a specific thickness while having elasticity, such as rubber.

The pad layer 620 has a smooth surface while maintaining the elasticity, such that the pad layer 620 is not pushed to one side but stably pressed against the outer surface of the tie rod 400 during the insertion process of the tie rod 400. Therefore, the pad layer 620 can minimize concentration of stress that may occur when the tie rod 400 is moved upward or downward by the support part 700.

Referring to FIG. 3, the body part 610 may be formed in a cylindrical shape and divided into a plurality of unit bodies. For example, the body part 610 illustrated in FIG. 2 is formed as one body while the body part 610 illustrated in FIG. 3 includes unit body 610a, which is formed in a ring shape and inserted onto the tie rod 400.

In this case, since the plurality of unit bodies are connected to each other or attached to each other, the unit bodies may not become damaged but stably attached to each other during use. For reference, FIG. 3 illustrates the body part 610 having one unit body 610a according to an exemplary embodiment. However, the body part 610 may include two or more unit bodies.

Since the groove 612 has a size corresponding to the diameter of the tie rod 400, the tie rod 400 may be pressed against the groove 612 when the tie rod 400 is coupled to the groove 612. When the tie rod 400 is rotated, friction is reduced while the tie rod 400 is relatively rotated with respect to the bearing 500. However, lubricant oil may be supplied to the tie rod 400 in order to minimize friction while stabilizing the rotation of the tie rod 400.

Figure 5:
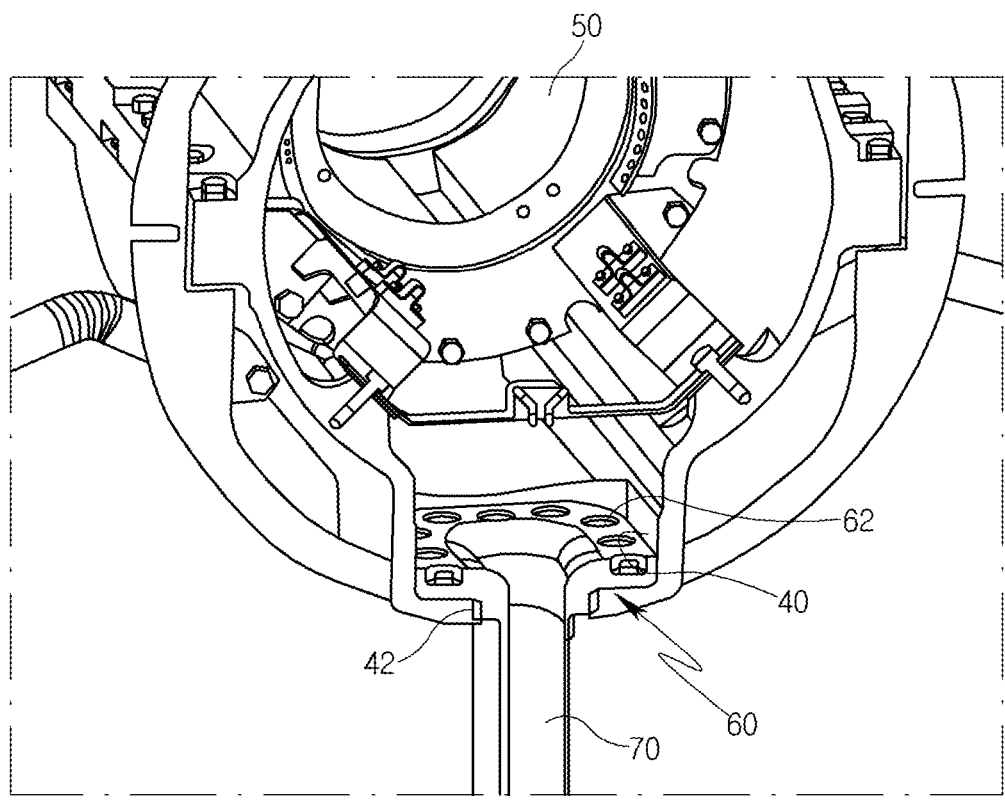
FIG. 5 is a perspective view of an internal casing where a support part is to be mounted according to an exemplary embodiment.
Figure 6:
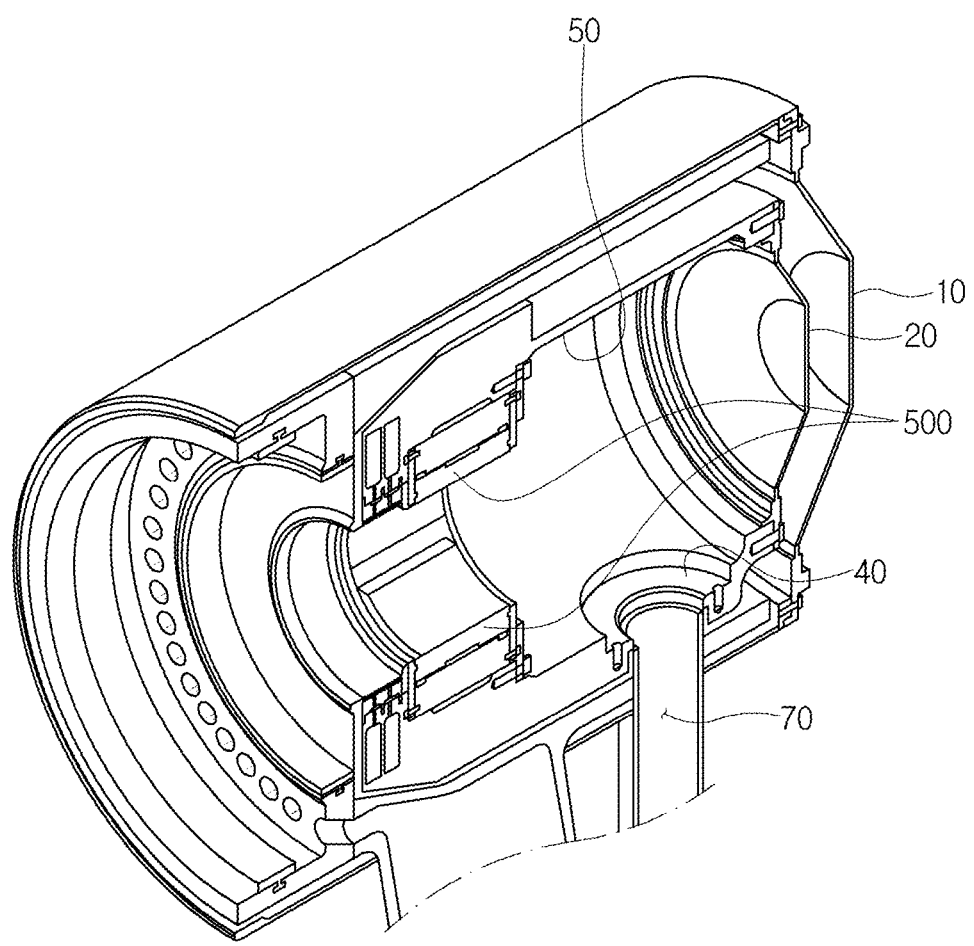
FIG. 6 is a perspective cross-sectional view of an internal casing having a bearing installed according to an exemplary embodiment.

Referring to FIGS. 5 and 6, the internal casing 50 according to an exemplary embodiment has a drain groove 40 through which the lubricant oil supplied for smooth rotation of the tie rod 400 drains, and a mounting member 60 for temporarily fixing the support part 700 is installed in the drain groove 40. The lubricant oil drains in the downward direction corresponding to the direction of gravity, after the lubricant oil has been supplied. At this time, the lubricant oil is collected in the groove 40 and then discharged through a drain hole 42 opened downward.

The outer circumferential surface of the mounting member 60 is pressed against the drain groove 40, and the mounting member 60 communicates with a path 70 which is partially inserted into the drain hole 42 formed in the center of the drain groove 40, and includes a plurality of mounting holes 62 formed along the edge of the path 70 when the path 70 is seen from the top. The mounting member 60 may be required for stably installing the support part 700, and the support part 700 may be easily fixed to the mounting member 60.

The mounting member 60 may be formed in a disk shape of which the central portion is extended toward the path 70, and the plurality of mounting holes 62 may be formed along the edge of the mounting member 60. At this time, a bolt may be coupled to each of the mounting holes 62 in order to fix the support part 700 and inserted into the mounting hole 62 through the support part 700.

Therefore, while the support part 700 is moved upward or downward with respect to the tie rod 400, the support part 700 can be stably fixed. Furthermore, while the bearing 500 is replaced, the support part 700 can stably support the tie rod 400. Thus, the operation safety and workability of the operator can be improved at the same time.

The mounting hole 62 has a screw thread formed on the inner circumference thereof. Thus, when the operator couples the support part 700 to the mounting holes 62 using bolts (not illustrated), the support part 700 is stably fixed.

Referring to FIG. 4, the support part 700 according to an exemplary embodiment includes insertion holes 702 and a support body 704. The insertion holes 702 have a diameter corresponding to the mounting hole 62, and the support body 704 is extended toward the tie rod 400.

The support body 704 may be formed in a cone shape, for example, but formed in different shapes. Furthermore, the moving part 710 is movably screw-coupled to the inner center position of the support body 704. For example, since a bolt head B1 is formed on the moving part 710 so as to be rotated in the clockwise direction or the counterclockwise direction, the bolt head B1 can be moved toward the top or bottom of the support part 700 when an operator rotates the bolt head B1 in the clockwise direction or the counterclockwise direction using a tool capable of rotating the bolt head B1. At this time, the top of the support part 700 indicates the 12 o'clock position based on FIG. 4.

The moving part 710 according to the exemplary embodiment may include a bolt B which is moved upward and downward in the center of the support body 704. The bolt B may have the bolt head B1 formed in a polygonal shape. When the bolt head B1 is rotated in the clockwise direction or the counterclockwise direction, the height can be adjusted in the vertical direction corresponding to the 12 or 6 o'clock direction based on FIG. 4. The bolt head B1 may have a larger diameter than the diameter illustrated in FIG. 4, and may not be limited to the diameter illustrated in FIG. 4.

Furthermore, a disk-shaped reference point indication part B2 is formed at the bottom of the bolt head B1. A bolt shaft 701 is extended to a predetermined length toward the axial direction of the bolt head B1, and has a screw thread formed on the outer circumferential surface thereof.

The bolt shaft 701 has a cone-shaped support body 704 formed at the bottom thereof and screw-coupled thereto, the support body 704 having a larger diameter than the bolt shaft 701.

The support part 700 has a disk-shaped support plate 703 formed at the bottom thereof, and the above-described insertion holes 702 are formed along the edge of the top surface of the support plate 703. The support plate 703 includes a zero point part 706 formed at the top surface thereof and having a plurality of gradations formed at predetermined intervals along the circumferential direction of the support body 704. When the zero point part 706 is formed, an operator can correctly recognize a displacement by a rotation of the bolt head B1. The zero point part 706 may be formed as grooves (not illustrated) with a predetermined depth in the support plate 703.

The bolt head B1 includes the reference point indication part B2 having a reference point marked at a position facing the zero point part 706, and the reference point indication part B2 may not be rotated with the bolt head B1, but rotated in the clockwise direction or the counterclockwise direction only by an operator. That is, the reference point indication part B2 allows the operator to correctly set the zero point and to recognize the range in which the bolt head B1 is rotated. For example, when the reference point indication part B2 and the zero point part 706 do not coincide with each other, the operator may adjust the zero point position by rotating the reference point indication part B2 in the clockwise direction or the counterclockwise direction such that the reference point indication part B2 coincides with a gradation formed on the zero point part 706.

The grooves of the zero point part 706 are coated with luminous paint such that the operator can visually check the initial position before the bolt head B1 is rotated. Thus, the operator can correctly recognize the position even under a dark operation condition such as the nighttime. For reference, the initial positions of the reference point indication part B2 and the zero point part 706 may be marked with an arrow or dot or a specific symbol.

The bolt head B1 facing the zero point part 706 has an indication part B3 indicating a moving distance of the tie rod 400 according to the rotation direction of the bolt head B1 which is relatively rotated with respect to the zero point part 706. The indication part B3 has gradations for indicating a moving distance of the tie rod 400 in the axial direction, depending on the rotation amount of the bolt head B1 in the clockwise direction or the counterclockwise direction. For example, both of the clockwise direction and the counterclockwise direction may be indicated by a specific unit (e.g., millimeter).

For example, an operator matches the initial positions of the reference point indication part B2 and the zero point part 706, in order to constantly maintain the clearance C between the tie rod 400 and the internal casing 50 before replacing the bearing 500. Then, when the operator rotates the bolt head B1 in the clockwise direction or the counterclockwise direction using a work tool, the zero point part 706 is not rotated, but only the bolt head B1 is rotated in the clockwise direction or the counterclockwise direction. The operator can check the number of gradations by the rotation of the bolt head B1 through the indication part B3 with the naked eye.

Hereafter, a support part according to another exemplary embodiment will be described with reference to the drawings.

Figure 7:
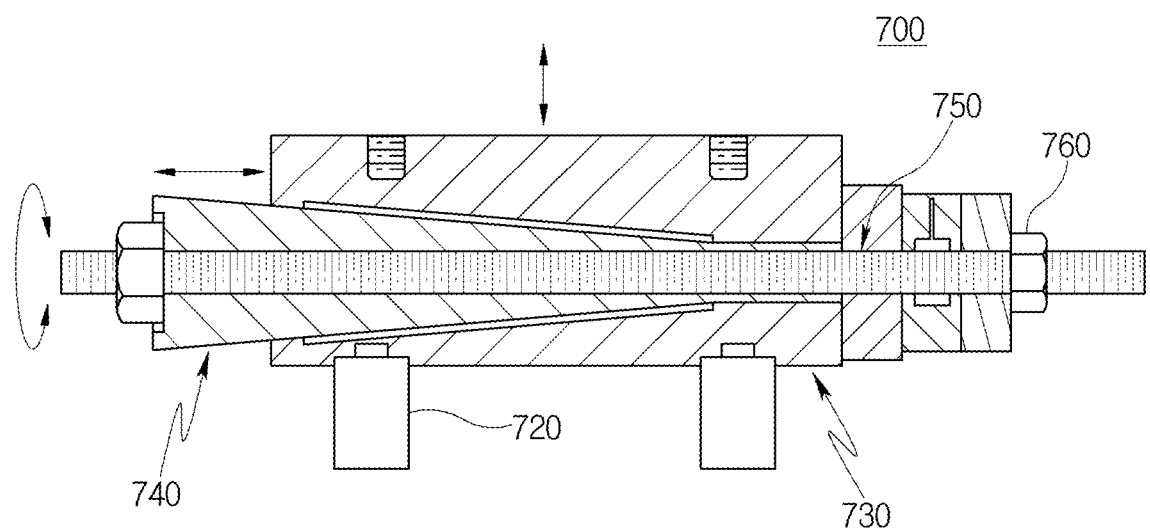
FIG. 7 is a longitudinal cross-sectional view of a support part according to another exemplary embodiment.

Referring to FIG. 7, the support part 700 includes a plurality of first support legs 720, a cylinder 730, a wedge part 740, a bolt bar 750 and flanges 760. The plurality of first support legs 720 are extended toward the insertion part 600 from the outside of the mounting holes 62, and separated from each other. The cylinder 730 is coupled to the tops of the first support legs 720, and horizontally extended under the tie rod 400. The wedge part 740 is inserted in the axial direction of the cylinder 730, and relatively moved along the axial direction of the cylinder 730 when being rotated in the cylinder 730. The bolt bar 750 is inserted in the axial direction of the wedge part 740, and relatively rotated with respect to the bolt bar 750. The flanges 760 are inserted onto front and rear ends of the bolt bar 750, respectively, and relatively rotated by the rotation of the bolt bar 750.

In the support part 700 according to the exemplary embodiment, the cylinder 730 may move the insertion part 600 in the vertical direction according to the rotation of the bolt bar 750, unlike the above-described support part. Thus, the space between the tie rod 400 and the internal casing 50 can be adjusted to replace the bearing 500.

The wedge part 740 inserted into the cylinder 730 according to the exemplary embodiment is formed in a cone shape, and the inside of the cylinder 730 is formed in a shape corresponding to the exterior of the wedge part 740. The cylinder 730 may have a diameter that decreases from the left end toward the right end based on the axial direction.

The bolt bar 750 is inserted in the axial direction into the wedge part 740, and has a screw thread formed along the axial direction. Thus, when the bolt bar 750 is rotated in the clockwise direction or the counterclockwise direction, the wedge part 740 may be moved to the left or right in the axial direction of the cylinder 730.

In this case, since the cylinder 730 can be moved upward or downward toward the insertion part 600, an operator can easily adjust the height of the tie rod 400. For reference, the flanges 760 are coupled to the front and read ends of the bolt bar 750. Any one of the flanges 760 is pressed against the outside of the wedge part 740 and the other of the flanges 760 is inserted into the right end of the cylinder 730.

Hereafter, a method for replacing a bearing of a gas turbine according to an exemplary embodiment will be described with reference to the accompanying drawings.

Figure 8:
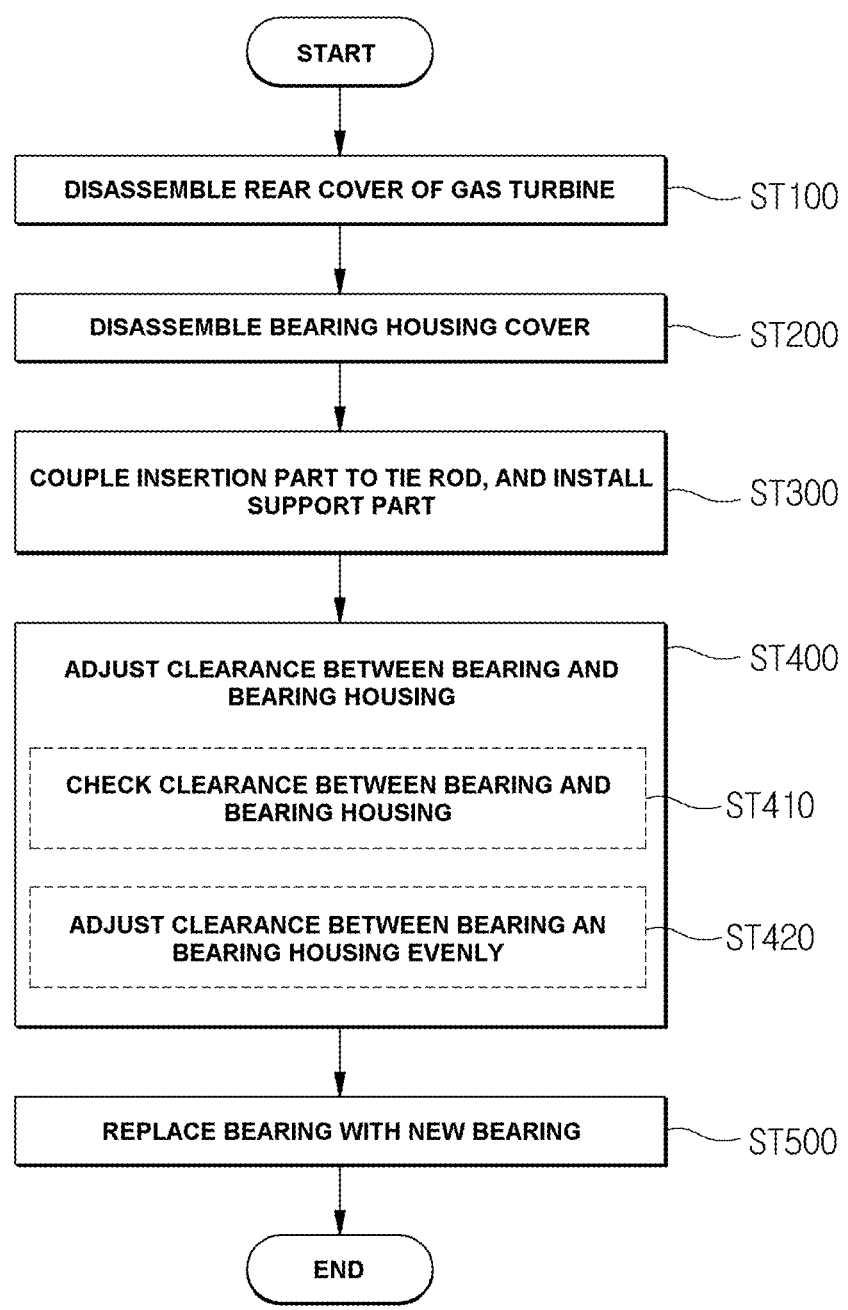
FIG. 8 is a flowchart illustrating a method for replacing a bearing of a gas turbine according to an exemplary embodiment.
Figure 9:
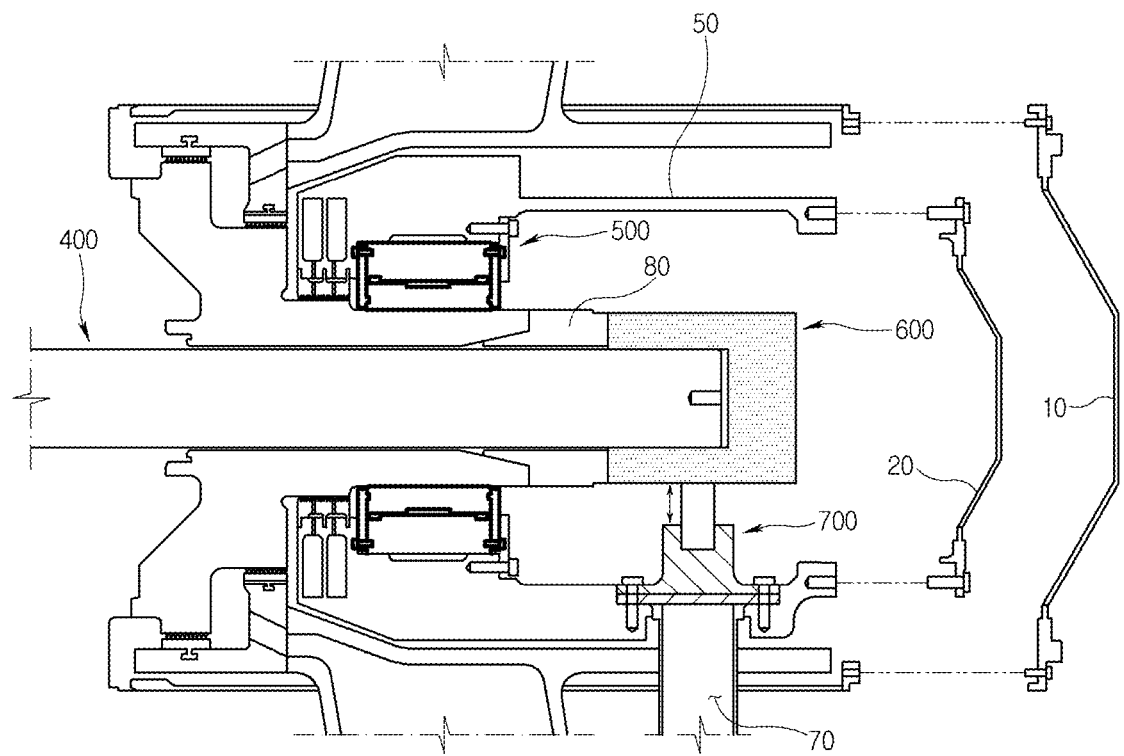
FIG. 9 is a cross-sectional view illustrating components that are separated during replacement of a bearing of a gas turbine according to an exemplary embodiment.

FIGS. 8 and 9 illustrate a method for replacing a bearing of a gas turbine according to the exemplary embodiment, where the gas turbine includes a compressor rotor, a turbine rotor, a tie rod extended through the compressor rotor and the turbine rotor, and a bearing covering the tie rod. The method includes disassembling a rear cover of the gas turbine (ST100), disassembling a bearing housing cover after the disassembling of the rear cover (ST200), coupling an insertion part to an end of the tie rod and installing a support part at the bottom of the insertion part (ST300), adjusting a clearance between the bearing and the bearing housing by adjusting the height of the support part in the vertical direction (ST400), and replacing the existing bearing with a new bearing after the adjusting of the clearance (ST500).

The gas turbine has a rear cover 10 installed thereon, and the rear cover 10 is installed outside, when seen from the rear side based on the axial direction of the tie rod 400 installed in the gas turbine. Since the rear cover 10 is fixed by a plurality of bolts in the circumferential direction, an operator needs to separate the rear cover 10 in advance in order to check the bearing 500, at step ST100.

The operator also separates the bearing housing cover 20 installed in front of the rear cover 10 in order to access the bearing 500, at step ST200.

Since the tie rod 400 is exposed when the rear cover 10 and the bearing housing cover 20 are separated, the operator couples an insertion part 600 to an end of the tie rod 400. Then, the operator installs a support part 700 at the bottom of the insertion part 600 at step S300. At this time, the operator fixes the position of the support part 700 such that the support part 700 is not moved. Since the fixing of the position of the support part 700 has been described above, the detailed descriptions thereof are omitted herein. For reference, when the support part 700 is installed, remaining lubricant oil drains through the drain hole 42. Thus, an operation delay by a large amount of oil does not occur.

Since the existing bearing 500 needs to be separated before replacement, the operator needs to adjust the clearance C between the bearing 500 and the bearing housing 50. The operator checks the clearance C between the bearing 500 and the bearing housing 50 at step ST410. At this time, it is desirable that the clearance C is constantly maintained in the circumferential direction. In some cases, however, the clearance C may differ in the circumferential direction. Therefore, the operator preferentially checks the state of the clearance C before replacing the bearing 500.

Furthermore, depending on the clearance C between the bearing 500 and the bearing housing 50, the operator adjusts the clearance C evenly in the circumferential direction of the bearing 500 through the support part 700, at step ST420. In order to adjust the clearance, the operator adjusts a movement height of the moving part 710 by rotating the bolt head B1 in the clockwise direction or the counterclockwise direction through the moving part 710 installed on the support part 700.

At this time, since the operator can check the movement height by the indication part B3 with the naked eye, the operator can correctly recognize a moving distance of the tie rod 400 which is moved downward or upward. When the clearance C between the bearing 500 and the bearing housing is constantly maintained, the operator releases the fixed state of the bearing 500 using a separate tool, and then separates the bearing 500 to the outside of the gas turbine.

The bearing 500 is separated in the radial direction of the tie rod 400 and then discharged to the outside in the axial direction. Then, the operator installs a new bearing at step ST500, rechecks the clearance C between the bearing 500 and the bearing housing, and reassembles the bearing housing cover 20 and the rear cover 10.

According to the exemplary embodiments of the present disclosure, an operator can easily adjust the clearance between the bearing and the bearing housing without using heavy equipment when replacing the bearing installed in the gas turbine, and then stably replace the bearing.

Furthermore, during the operation of replacing the bearing, the operator can stably move the tie rod. Therefore, a damage of the tie rod and neighboring parts can be minimized.

Furthermore, the operator can rapidly perform an operation on the bearing installed in the gas turbine, and perform the operation regardless of location. Therefore, the workability can be improved.

While the present disclosure has been described with respect to the specific embodiments, it will be apparent to those skilled in the art that various changes and modifications may be made without departing from the spirit and scope of the invention as defined in the following claims.

What is claimed is:

1. An apparatus for replacing a bearing coupled to a tie rod of a gas turbine, the tie rod being surrounded by an internal casing and extending through central axes of the plurality of compressor rotor disks and through central axes of the plurality of turbine rotor disks, the apparatus comprising:
    an insertion part configured to be coupled to an end of the tie rod extending toward the turbine rotor and to cover the end of the tie rod; and
    a support part configured to be installed below the insertion part, the support part including
        a moving part to move the tie rod upward and downward while supporting the insertion part, and
        a support plate removably attached to a mounting member configured to be seated in a drain groove formed in the internal casing.

2. The apparatus of claim 1, wherein the mounting member is configured to be pressed against the drain groove and to communicate with a path partially inserted into a drain hole formed in a center of the drain groove and includes mounting holes formed along the circumferential direction based on the path.

3. The apparatus of claim 2, wherein each of the mounting holes has a screw thread formed on an inner circumference thereof.

4. The apparatus of claim 2, wherein the support part further includes a support body extending towards the tie rod, the support plate including insertion holes having a diameter corresponding to the mounting holes, and the moving part is screw-coupled to a center of the support body and facing the insertion part.

5. The apparatus of claim 4, wherein the moving part is comprised of a bolt configured to move upward and downward in the center of the support body.

6. The apparatus of claim 5, wherein the bolt includes a bolt head.

7. The apparatus of claim 6, wherein the supporting part further includes a reference point indication part arranged below the bolt head and configured to rotate in a clockwise direction or a counterclockwise direction.

8. The apparatus of claim 6, wherein the bolt head includes an indication part for indicating a moving distance of the tie rod according to a rotation direction of the bolt head in reference to a zero point part formed on the support body.

9. The apparatus of claim 8, wherein the indication part of the bolt head indicates a moving distance depending on whether the bolt head is rotated in the clockwise direction or the counterclockwise direction.

10. The apparatus of claim 1, wherein the drain groove is configured to drain lubricant oil supplied for smooth rotation of the tie rod.

11. An apparatus for replacing a bearing coupled to a tie rod of a gas turbine, the tie rod extending through central axes of the plurality of compressor rotor disks and through central axes of the plurality of turbine rotor disks the tie rod and including an outer circumferential surface and a distal end having an axially facing surface communicating with the outer circumferential surface, the apparatus comprising:
    an insertion part configured to be coupled to the tie rod toward the turbine rotor, the insertion part including an inner surface configured to cover the axially facing surface of the distal end of the tie rod and to cover at least a portion of the outer circumferential surface extending from the distal end; and
    a support part configured to be installed radially outward from the outer circumferential surface of the tie rod so as to be disposed below the insertion part, the support part including a moving part to move the tie rod upward and downward while supporting the insertion part.

12. The apparatus of claim 11,
    wherein the insertion part includes a body part configured to be inserted over the distal end of the tie rod so as to face the axially facing surface of the distal end of the tie rod when the insertion part is coupled to the tie rod, and
    wherein the inner surface of the insertion part includes a groove with a diameter corresponding to a diameter of the tie rod.

13. The apparatus of claim 11, wherein the insertion part has a cylindrical shape and includes at least one unit body having an annular shape corresponding to the cylindrical shape, the at least one unit body configured to be inserted over the distal end of the tie rod before the body part is inserted over the distal end of the tie rod.

14. The apparatus of claim 11, wherein the support part includes
a plurality of first support legs,
a cylinder coupled to the plurality of first support legs and extending horizontally below the tie rod,
a wedge part inserted in an axial direction of the cylinder and movable along the axial direction of the cylinder when rotated,
a bolt bar inserted in the axial direction of the wedge part, and relatively rotatable with respect to the wedge part, and
a plurality of flanges inserted onto front and rear ends of the bolt bar.

15. The apparatus of claim 14, wherein the cylinder has a diameter that decreases from one end to the other end in the axial direction.

16. The apparatus of claim 14, wherein the wedge part has a shape that corresponds to the cylinder.

17. The apparatus of claim 13, wherein the inner surface of the insertion part further includes an inner circumferential surface of the at least one unit body that faces the outer circumferential surface of the tie rod extending from the distal end.

18. The apparatus of claim 17, further comprising a pad layer disposed between the tie rod and the inner circumferential surface of the at least one unit body.

19. The apparatus of claim 12, further comprising a pad layer disposed between the tie rod and the groove of the insertion part.

20. The apparatus of claim 11, further comprising a pad layer disposed between the tie rod and the inner surface of the insertion part.

* * * * *